(12) United States Patent
Park et al.

(10) Patent No.: US 11,175,300 B2
(45) Date of Patent: Nov. 16, 2021

(54) BIOLOGICAL SAMPLE PROCESSING APPARATUS

(71) Applicant: BIONEER CORPORATION, Daejeon (KR)

(72) Inventors: Han Oh Park, Daejeon (KR); Yang Won Lee, Daejeon (KR); Jin Il Lee, Daejeon (KR); Jung Do Kim, Daejeon (KR); Dae Jin Jang, Daejeon (KR); Jong Kab Kim, Gyeongju-si (KR)

(73) Assignee: BIONEER CORPORATION, Daejeon (KR)

( * ) Notice: Subject to any disclaimer, the term of this patent is extended or adjusted under 35 U.S.C. 154(b) by 315 days.

(21) Appl. No.: 16/338,218

(22) PCT Filed: Sep. 28, 2017

(86) PCT No.: PCT/KR2017/010802
§ 371 (c)(1),
(2) Date: Mar. 29, 2019

(87) PCT Pub. No.: WO2018/062889
PCT Pub. Date: Apr. 5, 2018

(65) Prior Publication Data
US 2019/0227091 A1    Jul. 25, 2019

(30) Foreign Application Priority Data
Sep. 29, 2016 (KR) .................. 10-2016-0125459

(51) Int. Cl.
*G01N 35/04*    (2006.01)
*G01N 35/10*    (2006.01)
(Continued)

(52) U.S. Cl.
CPC ............ *G01N 35/04* (2013.01); *B01L 3/0237* (2013.01); *G01N 35/00* (2013.01); *G01N 35/02* (2013.01);
(Continued)

(58) Field of Classification Search
CPC ........ G01N 35/04; G01N 35/10; G01N 35/00; G01N 35/02; G01N 35/026;
(Continued)

(56) References Cited

U.S. PATENT DOCUMENTS

| 8,133,671 B2 | 3/2012 | Williams et al. | |
| 2007/0077646 A1* | 4/2007 | Okamoto | B01L 7/00 435/288.4 |

(Continued)

FOREIGN PATENT DOCUMENTS

| EP | 2 565 260 A2 | 3/2013 |
| JP | 5954532 B2 | 7/2016 |

(Continued)

OTHER PUBLICATIONS

Russian Office Action for related RU application No. 2019112684/28(024628) dated Jan. 20, 2021 from Russian Patent Office.

(Continued)

*Primary Examiner* — Jill A Warden
*Assistant Examiner* — John McGuirk
(74) *Attorney, Agent, or Firm* — Paratus Law Group, PLLC (57) ABSTRACT

A biological sample processing apparatus, including: a pipette block with which a plurality of pipettes for sucking or discharging a biological sample in a multi-well plate in which wells are arranged in a matrix shape along row and column directions are detachably coupled; a pipette block forward and backward transfer unit configured to move the pipette block along a forward and backward direction along (Continued)

a process direction; a pipette block top and bottom transfer unit configured to move the pipette block along a vertical direction; a magnetic field applying unit disposed below the multi-well plate for applying a magnetic field to a well of the multi-well plate; and a heating unit disposed below the multi-well plate so as to be spaced apart from the magnetic field applying unit, for heating a well of the multi-well plate.

13 Claims, 9 Drawing Sheets

(51) Int. Cl.
  *G01N 35/00* (2006.01)
  *G01N 35/02* (2006.01)
  *B01L 3/02* (2006.01)
(52) U.S. Cl.
  CPC ........... *G01N 35/026* (2013.01); *G01N 35/10* (2013.01); *G01N 35/1081* (2013.01); *G01N 2035/00287* (2013.01); *G01N 2035/00425* (2013.01); *G01N 2035/0401* (2013.01); *G01N 2035/0477* (2013.01); *G01N 2035/106* (2013.01)
(58) Field of Classification Search
  CPC ..... G01N 35/1081; G01N 2035/00425; G01N 2035/106; G01N 2035/0477; G01N 2035/00287; G01N 2035/0401; G01N 35/1079; G01N 35/109; G01N 35/1074; B01L 3/0237; B01L 7/00; B01L 2300/0829; B01L 2300/0672; B01L 3/0293
  See application file for complete search history.

(56) References Cited

U.S. PATENT DOCUMENTS

| | | | |
|---|---|---|---|
| 2007/0092403 | A1 | 4/2007 | Wirbisky et al. |
| 2007/0212264 | A1* | 9/2007 | Beer ................... G01N 35/1079 422/400 |
| 2009/0221059 | A1* | 9/2009 | Williams ................ B01L 9/527 435/287.2 |
| 2010/0136563 | A1* | 6/2010 | Keller ..................... B03C 1/288 435/6.12 |
| 2010/0210010 | A1* | 8/2010 | Lee ........................ B01L 3/5029 435/288.3 |
| 2011/0005932 | A1 | 1/2011 | Jovanovich et al. |
| 2013/0230860 | A1* | 9/2013 | Park ........................ C12Q 1/686 435/6.12 |

FOREIGN PATENT DOCUMENTS

| | | |
|---|---|---|
| KR | 10-1025135 B1 | 3/2011 |
| KR | 10-1420094 B1 | 7/2014 |
| KR | 10-1443727 B1 | 9/2014 |
| RU | 2559541 C2 | 8/2015 |
| WO | WO 2012/012779 A2 | 1/2012 |
| WO | WO 2012/057548 A2 | 5/2012 |

OTHER PUBLICATIONS

Extended European Search Report for related EP application No. 17856775.6 dated May 27, 2020 from European Patent Office.
International Search Report for PCT/KR2017/010802 dated Feb. 2, 2018 from Korean Intellectual Property Office.

* cited by examiner

|  | Exiprep ™ 48 | | Exiprep ™ Dx | |
|---|---|---|---|---|
|  | HIV-1 | IPC | HIV-1 | IPC |
|  | 37.06 | 26.27 | 37.55 | 24.82 |
|  | 36.24 | 24.86 | 37.80 | 25.22 |
|  | 36.41 | 25.76 | 38.63 | 25.38 |
|  | 37.12 | 25.72 | 37.81 | 25.10 |
|  | 37.03 | 25.72 | 37.09 | 25.20 |
|  | 37.14 | 25.51 | 37.61 | 25.18 |
|  | 37.40 | 25.97 | 36.68 | 25.21 |
|  | 37.79 | 26.01 | 38.12 | 25.30 |
| AV | 36.95 | 25.62 | 37.66 | 25.18 |
| CV(%) | 1.14% | 1.87% | 1.59% | 0.66% |

[Figure 10]

BIOLOGICAL SAMPLE PROCESSING APPARATUS

CROSS-REFERENCE TO PRIOR APPLICATIONS

This application is a National Stage Patent Application of PCT International Patent Application No. PCT/KR2017/010802 (filed on Sep. 28, 2017) under 35 U.S.C. § 371, which claims priority to Korean Patent Application No. 10-2016-0125459 (filed on Sep. 29, 2016), which are all hereby incorporated by reference in their entirety.

BACKGROUND

The present invention relates to a biological sample processing apparatus, and more particularly, to an apparatus for treatment such as purifying or extracting a biological sample.

The biotechnology industry to increase organisms which are in extremely small quantities in nature or the intrinsic functions of the organisms themselves for mass product or to produce useful organisms is becoming more important.

There are four basic technologies in the bio industry. First, there is a gene recombination technology that extracts specific genetic information from an organism and inserts it into a gene of a fast-growing microorganism (for example, colon bacillus). Other basic technologies include cell fusion technology, mass culture technology, and bioreactor technology. Such studies are actively being carried out in medicines, chemicals, foods, and textiles.

On the other hand, development of a biological sample processing apparatus for automating the bio-industrial technology has been actively carried out. Korean Patent No. 10-1025135 by the present applicant discloses an automatic refining apparatus capable of separating a desired substance from a plurality of biological samples using magnetic particles.

Such an automatic refining apparatus processes biological samples as the pipettes are moved into a multi-well plate kit in which the reagents for analysis are sequentially injected and inhale or discharge reagents or analytical samples.

Such an automatic refining apparatus extracts the target material by attaching the magnetic particles to the target material, then removing the remaining material, and separating the magnetic particles and the target material. In order for that, the automatic refining apparatus is configured such that a magnet for applying a magnetic field is applied at the side of the pipette by rotation, so that it is not easy to extract a target material.

Further, the pipette is lowered and punches sealing portion of the multi-well plate to open the sealing portion of the multi-well plate, so that contamination may occur when punching the multi-well.

SUMMARY

Accordingly, it is an object of the present invention to provide a biological sample processing apparatus that can easily apply and release a magnetic field.

Another object of the present invention is to provide a biological sample processing apparatus capable of preventing contamination that may occur when punching a seal portion of a multi-well plate.

A biological sample processing apparatus of an exemplary embodiment of the present invention includes a pipette block, a pipette block forward and backward transfer unit, a pipette block top and bottom transfer unit, a magnetic field applying unit, and a heating unit. The pipette block are detachably coupled with a plurality of pipettes for sucking or discharging a biological sample in a multi-well plate in which wells are arranged in a matrix shape along row and column directions. The pipette block forward and backward transfer unit moves the pipette block along a forward and backward direction along a process direction. The pipette block top and bottom transfer unit moves the pipette block along a vertical direction. The magnetic field applying unit is disposed below the multi-well plate for applying a magnetic field to a well of the multi-well plate. The heating unit is disposed below the multi-well plate so as to be spaced apart from the magnetic field applying unit, for heating a well of the multi-well plate.

For example, the magnetic field applying unit may be disposed in front of the heating unit based on a process direction.

On the other hand, the biological sample processing apparatus may further comprise a horizontal transfer unit configured to transfer at least one of the magnetic field applying unit and the heating unit.

The horizontal transfer unit may transfer the magnetic field applying unit and the heating unit separately.

The magnetic field applying unit may comprise a plurality of bar-shaped magnet bars arranged in two diagonal directions of the matrix.

The magnetic field applying unit may comprise a magnet moving unit configured to move the magnet bars up and down.

The biological sample processing apparatus may further comprise a punching unit for punching and opening a cover of the multi-well plate.

The punching unit may be configured to be detachably combined with the pipette block to be transferred by the pipette block forward and backward transfer unit and the pipette block top and bottom transfer unit.

The biological sample processing apparatus may further comprise a pipette storage unit configured to store a separated pipette that is used in a first step in a process, and a pipette buffer unit configured to store a pipette to be used in a second step in the process.

The biological sample processing apparatus may further comprise a sensing unit configured to sense whether the storage unit is mounted.

The biological sample processing apparatus may further comprise an alarm unit configured to notify that the storage unit is not installed as a result of detection by the detection unit.

A biological sample processing apparatus according to another embodiment comprises a pipette block, a pipette block forward and backward transfer unit, a pipette block top and bottom transfer unit and a punching unit. The pipette block are detachably coupled with a plurality of pipettes for sucking or discharging a biological sample in a multi-well plate in which wells are arranged in a matrix shape along row and column directions. The pipette block forward and backward transfer unit moves the pipette block along a forward and backward direction along a process direction. The pipette block top and bottom transfer unit moves the pipette block along a vertical direction. The punching unit punches and opens a cover of the multi-well plate.

The punching unit may be configured to be detachably combined with the pipette block to be transferred by the pipette block forward and backward transfer unit and the pipette block top and bottom transfer unit.

The biological sample processing apparatus may further comprise a pipette storage unit configured to store a separated pipette that is used in a first step in a process, and a pipette buffer unit configured to store a pipette to be used in a second step in the process.

The biological sample processing apparatus may further comprise a sensing unit configured to sense whether the storage unit is mounted.

The biological sample processing apparatus may further comprise an alarm unit configured to notify that the storage unit is not installed as a result of detection by the detection unit.

The punching unit may be configured to punch only selected wells of the multi-well plate.

In the biological sample processing apparatus according to the present invention, the magnetic field applying unit and the heating unit are disposed below the multi-well plate and the magnetic field is applied to the lower part, thereby attracting the target sample combined with the magnetic particles to the bottom, so that separation of target sample becomes more convenient.

Further, by separating the magnetic field applying unit and the heating unit, it is possible to perform additional processes between the process of separation by applying a magnetic field, and the process of removing ethanol by heating, thereby making it possible to cope with a process required for new biological sample processing. Further, when the magnetic field applying unit and the heating unit are separately arranged as described above, it is possible to perform the secondary processing operation immediately without waiting for the cooling time of the heating unit after the primary processing operation, so that the analysis time can be shortened in performing multi-analysis.

In addition, when the biological sample processing apparatus includes the horizontal transfer unit for transferring at least one of the magnetic field applying unit and the heating unit, the biological sample processing apparatus may perform the biological sample processing even if an arbitrary multi-well plate is accommodated.

In addition, when the horizontal transfer unit is configured to transfer the magnetic field applying unit and the heating unit separately, the degree of freedom is further increased to process biological sample, even when an arbitrary multi-well plate is accommodated.

In addition, when the magnetic field applying unit includes the plurality of bar-shaped magnet bars arranged in two diagonal directions of a matrix, and the magnet moving unit moving the magnet bars up and down, it is easy to apply and release the magnetic field to or from the multi-well plate so that the target material combined with the magnetic particles in the upper portion of the well can be more easily guided to the lower portion.

In addition, when the biological sample processing apparatus includes the punching unit for punching and opening the sealing of the multi-well plate, it is possible to prevent contamination that may occur when releasing the seal of the multi-well plate.

When the punching unit is detachably coupled to the pipette block and is configured to be transported by the pipette block forward and backward transfer unit and the pipette block top and bottom transfer unit, a separate driving unit for transferring the punching unit is not required, so that it is possible to reduce the number of components, thereby reducing the manufacturing cost.

Further, when the biological sample processing apparatus includes the pipette storage unit for storing a separated pipette that is used in a first step in a process, and the pipette buffer unit for storing a pipette to be used in the second step in the process, a pipette can be replaced to prevent contamination during processing a biological sample.

Further, when the biological sample processing apparatus includes the sensing unit for sensing whether the storage unit is mounted, and the alarm unit for notifying that the storage unit is not mounted, the biological sample processing apparatus can be prevented from being contaminated and the accuracy of the analysis can be improved, since operation of the biological sample processing apparatus without mounting the storage unit is prevented.

In addition, when the punching unit is configured to punch only selected wells of the multi-well plate, the inspection can be performed only selected objects to be inspected.

DETAILED DESCRIPTION

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art.

It will be understood that, although the terms first, second, etc. may be used herein to describe various elements, components, regions, layers and/or sections, these elements, components, and/or sections should not be limited by these terms. These terms are only used to distinguish one element, component, region, layer or section from another region, layer or section. Thus, a first element, component, or section discussed below could be termed a second element, component, or section without departing from the teachings of the present invention.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the drawings.

Figure 1:
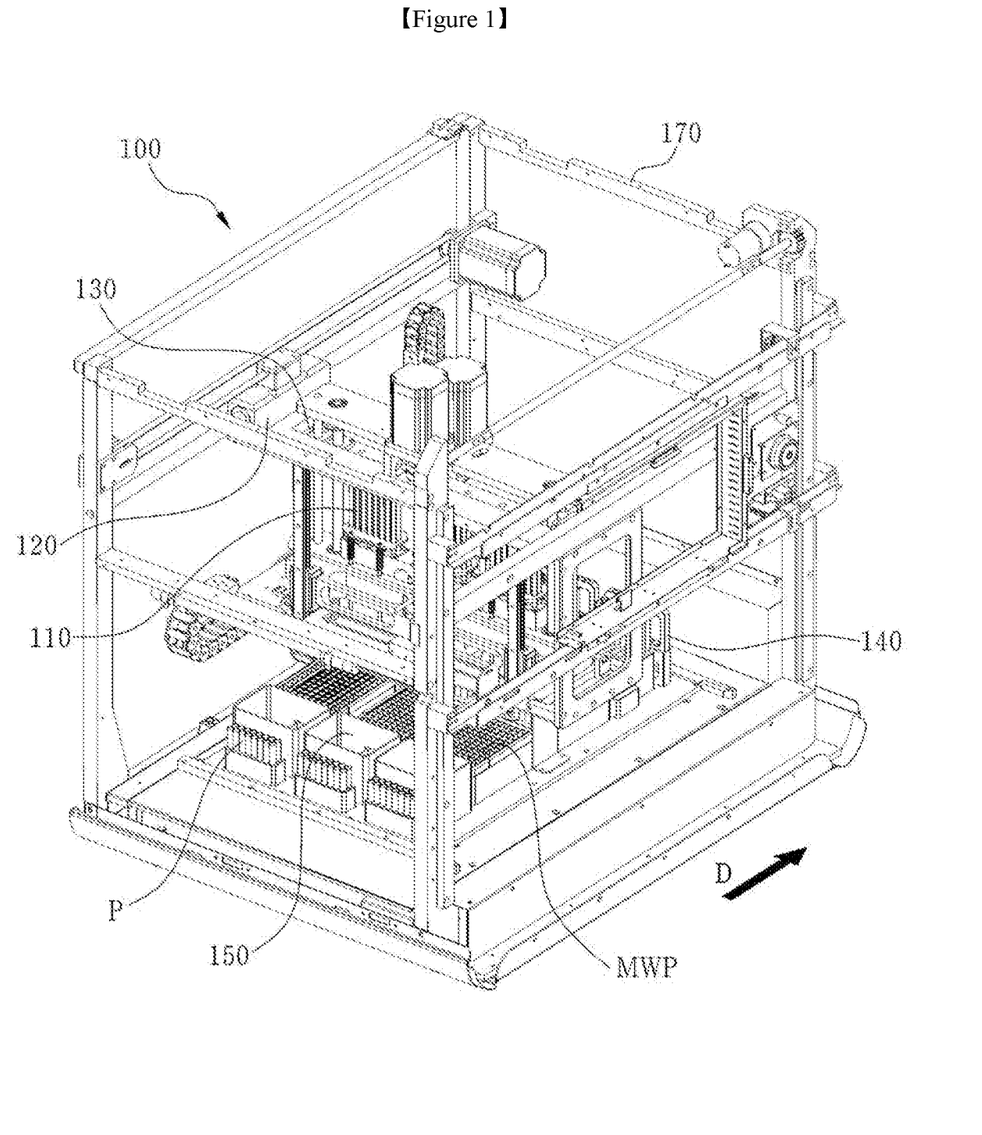
FIG. 1 is a perspective view showing a biological sample processing apparatus according to an exemplary embodiment of the present invention.
Figure 2:
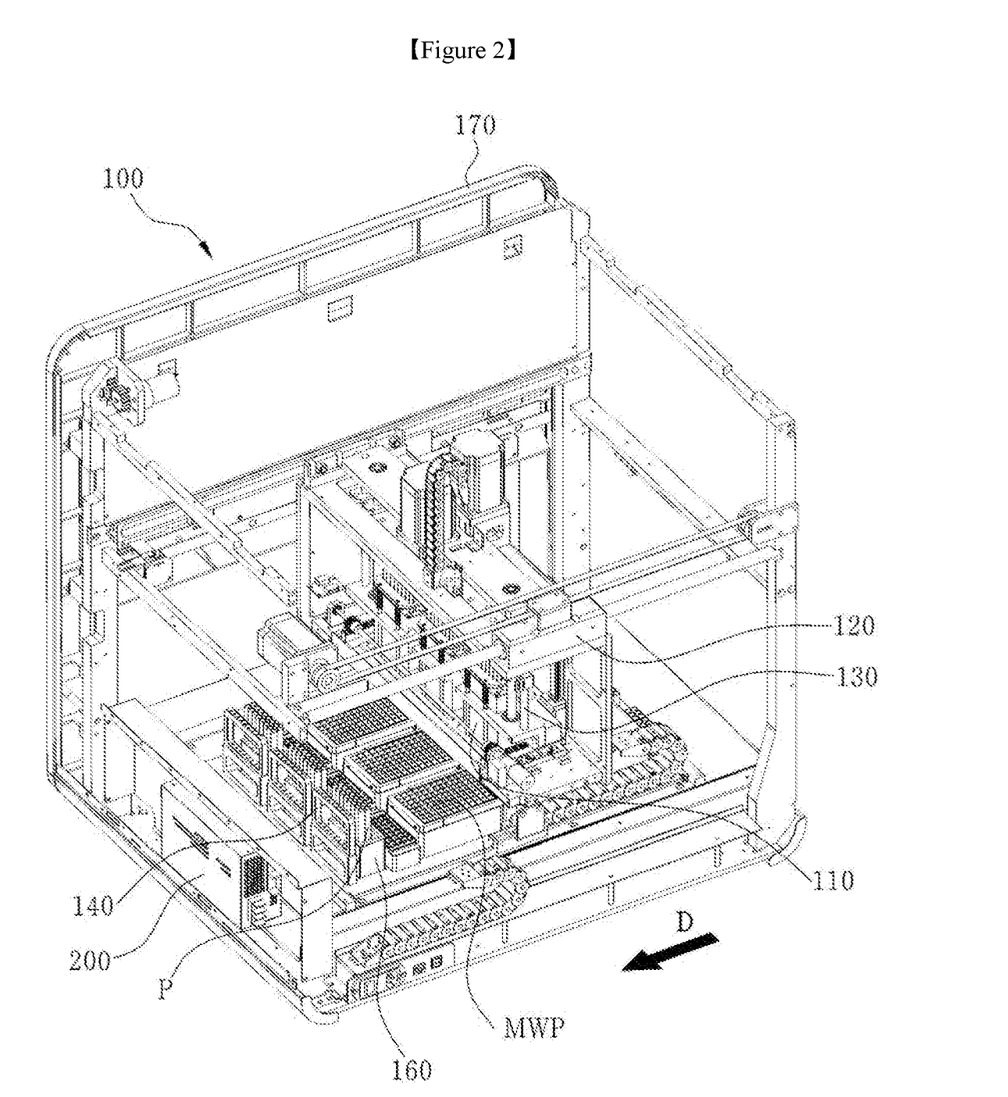
FIG. 2 is a perspective view of the biological sample processing apparatus shown in FIG. 1, which is shown from other angle.
Figure 3:
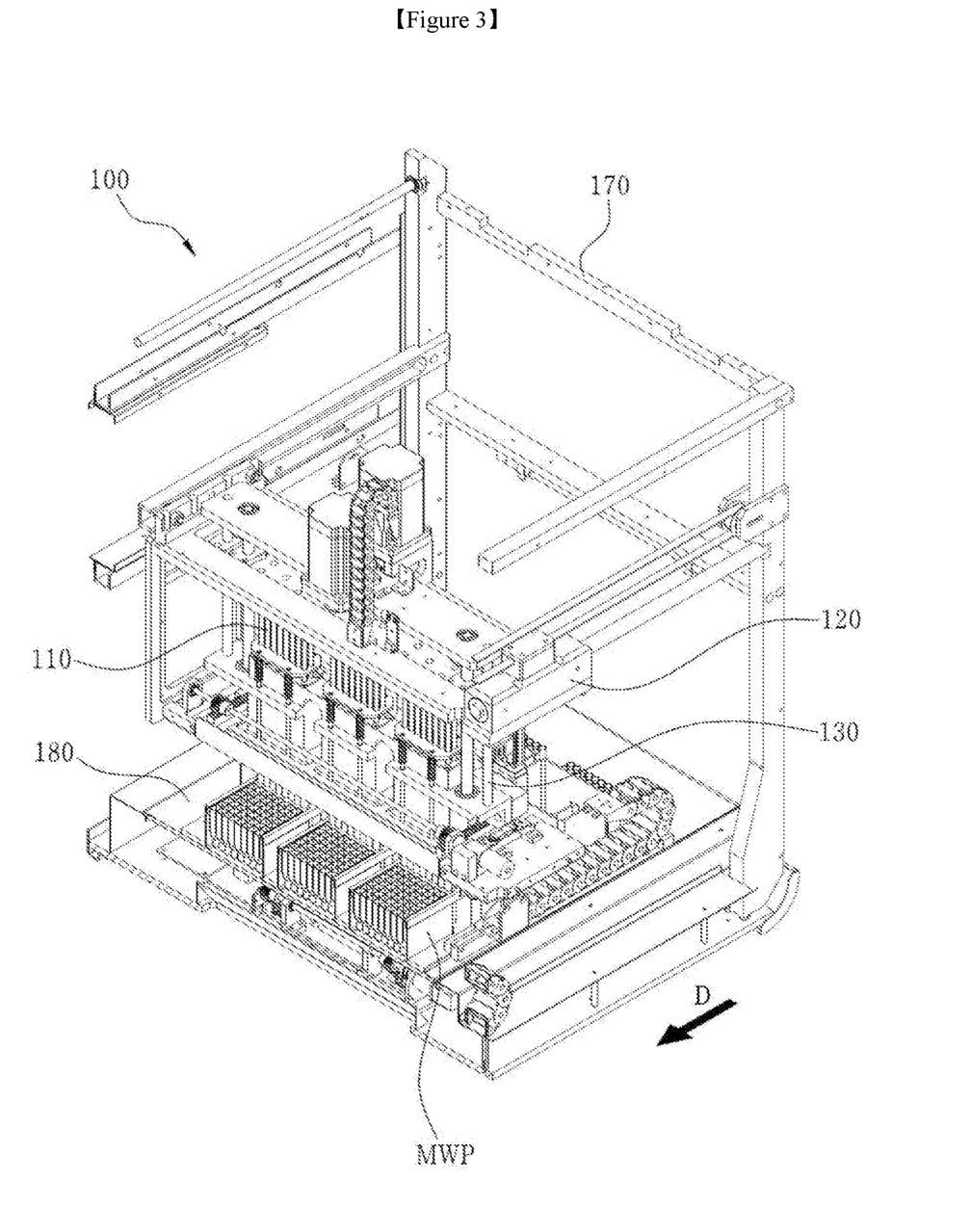
FIG. 3 is a cross-sectional view showing a portion of FIG. 2.

FIG. 1 is a perspective view showing a biological sample processing apparatus according to an exemplary embodiment of the present invention, FIG. 2 is a perspective view of the biological sample processing apparatus shown in FIG. 1, which is shown from other angle, and FIG. 3 is a cross-sectional view showing a portion of FIG. 2.

Figure 6:
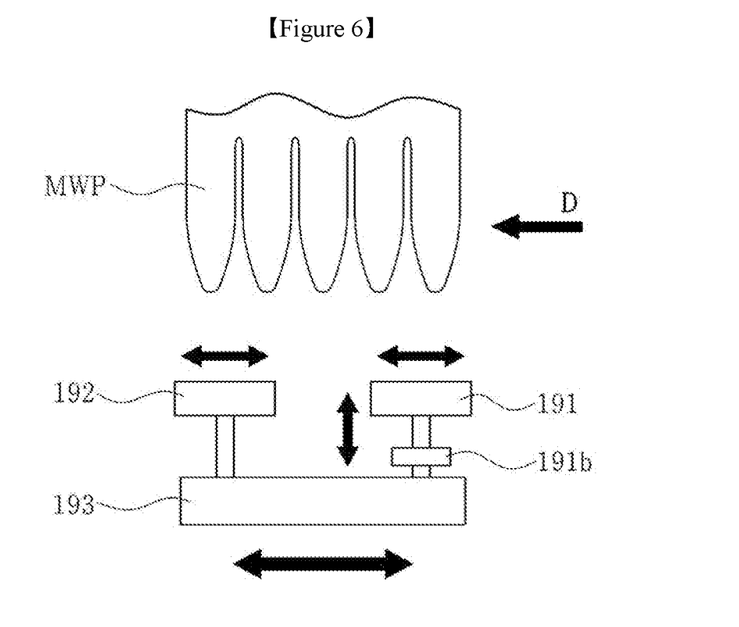
FIG. 6 is a conceptual diagram of a heating unit and a magnetic field applying unit of the biological sample processing apparatus according to an exemplary embodiment of the present invention.

Referring to FIGS. 1 to 3, a biological sample processing apparatus 100 according to an exemplary embodiment of the present invention includes a pipette block 110, a pipette block forward and backward transfer unit 120, a pipette block top and bottom transfer unit 130, a magnetic field applying section (191 in FIG. 6) and a heating unit (192 in FIG. 6).

The pipette block 110 is detachably coupled with a plurality of pipettes P for sucking or discharging a biological sample in a multi-well plate (MWP) in which wells are arranged in a matrix form along the row and column directions. Although the pipette blocks 110 are arranged in three rows in the FIGS. 1 to 3, they can be arranged in more than one row, for example, and can conduct a plurality of analyzes simultaneously. The pipettes P may be formed of plastic, for example, in the form of a syringe, and after being analyzed, pipettes P are replaced as a consumable item to prevent contamination during analysis of other samples.

The pipette block forward and backward transfer unit 120 moves the pipette block 110 along the forward and backward direction, which is the process direction D of the pipette block. The pipette block top and bottom transfer unit 130 moves the pipette block 110 along the vertical direction to attach or detach the pipette P. For example, the pipette block forward and backward transfer unit 120 may be installed at the frame 170, and the pipette block top and bottom transfer unit 130 may be installed at the pipette block forward and backward transfer unit 120.

In the multi-well plate (MWP) contains various samples along the process direction. The pipette P is transferred downward by the pipette block top and bottom transfer unit 130 to suck samples of first column of the multi-well plate (MWP), the pipette P is transferred upward by the pipette block top and bottom transfer unit 130 and then transferred to a second column of the multi-well plate (MWP) along the proceeding direction D by the pipette block forward and backward transfer unit 120. After being transferred to the second column, the pipette P is transferred downward by the pipette block top and bottom transfer unit 130 to discharge the samples for reacting it in the second row, the pipette P is transferred upward by the pipette block top and bottom transfer unit 130 and then transferred to a third column of the multi-well plate (MWP) along the proceeding direction D by the pipette block forward and backward transfer unit 120. The biological samples are processed by repeating the above process. This process is performed under the control of the control unit 200 and will be described in more detail with reference to FIG. 4.

The biological sample processing apparatus 100 may further include a pipette storage unit 150 for storing a pipette used in a first stage in the process and a pipette buffer unit 160 for storing a pipette to be used in the second stage in the process. Accordingly, in the biological sample processing apparatus according to the present invention, the pipette P can be replaced in order to prevent contamination during the sample processing step.

Figure 8:
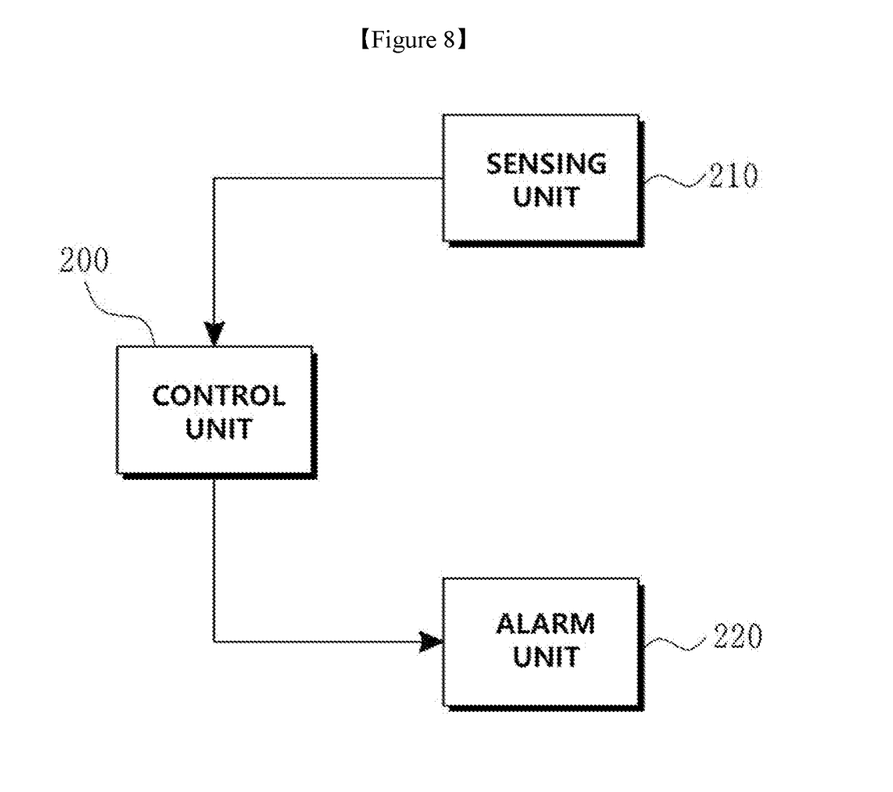
FIG. 8 is a block diagram showing a control unit, a sensing unit and an alarm unit of the biological sample processing apparatus of the present invention.

The biological sample processing apparatus 100 may further include a sensing unit 210 for sensing whether the storage unit 150 is mounted, as shown in FIG. 8. For example, a magnet may be installed at the lower surface of the storage unit 150, and the sensing unit 210 may include a sensor for sensing the magnetic field.

In addition, the biological sample processing apparatus 100 may further include an alarm unit 220 to notify that the storage unit 150 is not mounted, which is sensed by the sensing unit 210, when the storage unit 150 is not mounted. The control unit 200 receives the detection signal of the sensing unit 210 and drives the alarm unit 220 when the storage unit 150 is not mounted.

For example, the alarm unit 220 may notify a user that the storage unit 150 is not mounted through a sound such as a siren, or a blinking light. Furthermore, the control unit 200 may control the biological sample processing apparatus 100 to stop operation when the storage unit 150 is not mounted.

Figure 5:
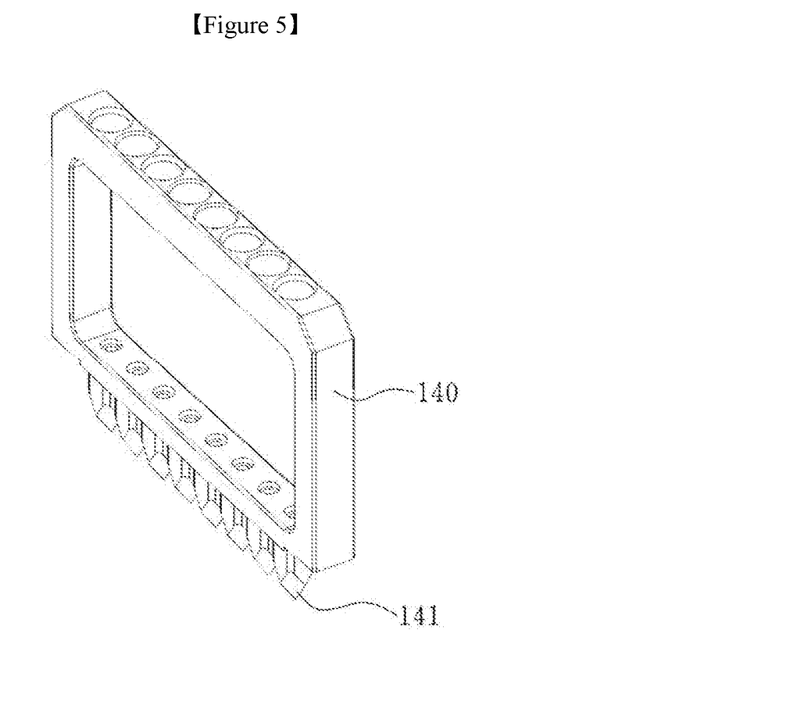
FIG. 5 is a perspective view of a punching unit.

The biological sample processing apparatus 100 may further include a punching unit 140 for punching to open the cover of the multi-well plate MWP. The punching unit 140 may be formed, for example, by attaching a punch 141 to a lower portion of a rectangular frame as shown in FIG. 5. The punching unit 140 may be formed in various shapes aside from the example.

The punching unit 140 may be detachably coupled to the pipette block 110 and may be transported by the pipette block forward and backward transfer unit 120 and the pipette block top and bottom transfer unit 130. That is, when the multi-well plate MWP is mounted, the control unit 200 drives the pipette block forward and backward transfer unit 120 to transfer the pipette block 110 toward the punching unit 140. Then, the control unit 200 drives the pipette block top and bottom transfer unit 130 to install the punching unit 140 to the pipette block 110 and then drives the pipette block forward and backward transfer unit 120 again to move the punching unit 140 toward the plate MWP. Thereafter, the pipette block top and bottom transfer unit 130 is driven again to move the punching unit 130 downward and upward to punch the cover of the multi-well plate MWP, and then the pipette block forward and backward transfer unit 120 and the pipette block top and bottom transfer unit 130 are driven to return the punching unit 140 to its original position. Then, after the pipette block 110 installs the pipette P, the biological sample analysis is performed while moving each column of the multi-well plate MWP as described above.

As described above, when the biological sample processing apparatus 100 includes the punching unit 140 for punching and opening the cover of the multi-well plate MWP, it is possible to prevent contamination, when the sealing portion of the multi-well plate MWP is opened.

The punching unit 140 may be configured to punch only selected wells of the multi-well plate. The punching unit 140 shown in FIG. 5 has eight punches 141 that are fixed. Therefore, when one punching unit 140 is driven, all the wells in the eight rows are opened. However, when the punches 141 are constructed so as to be able to move individually up and down, punching can be performed only for the selected wells to open the selected wells.

That is, when the punching unit 140 is configured to punch only selected wells of the multi-well plate, it is possible to conduct inspection on a small number of objects to be inspected. More specifically, for example, in the case of inspecting a sample taken from one or two patients, only twelve (1×12) or twenty four (2×12) wells are required, but all of the wells are opened when the punching unit 140 having the fixed punch 141 shown in FIG. 5 is driven, and the remaining wells are consumed in an unused state, so that the multi-well plate is wasted. Alternatively, when the punching unit 140 is driven only when the eight patients are gathered, the waste of the multi-well plate can be prevented, but there is a problem that the punching unit 140 in FIG. 5 must stand by until the eight patients are collected. Therefore, when the punching unit 140 is configured to punch only selected wells of the multi-well plate, the opening of the remaining wells can be prevented while proceeding directly to a small number of patients so that the multi-well plate can be reused.

Figure 4:
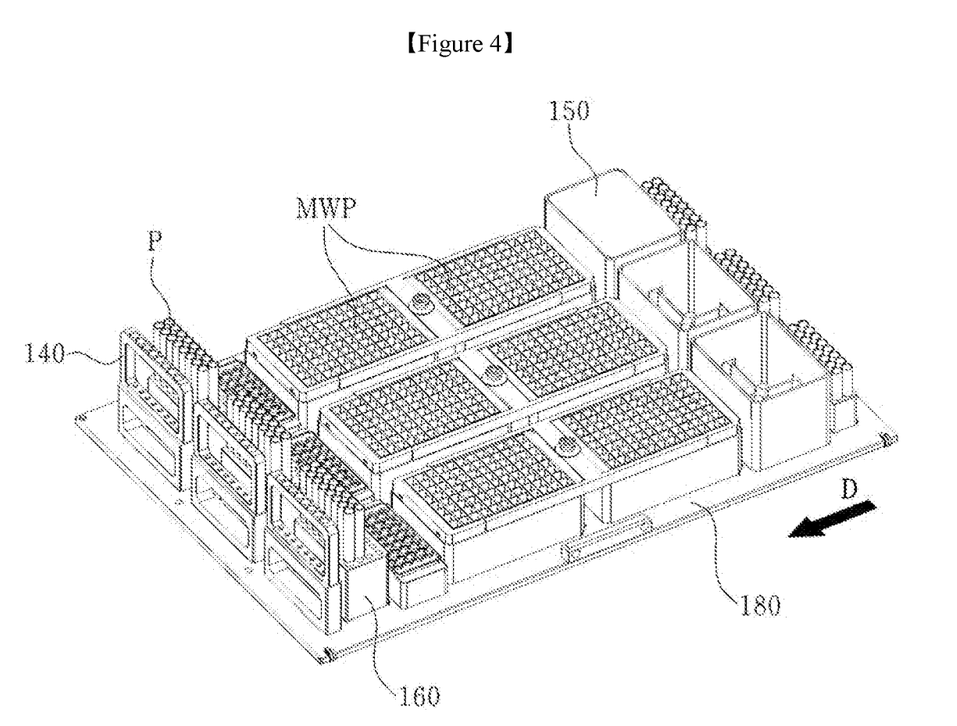
FIG. 4 is a perspective view showing a portion of FIG. 1.

FIG. 4 is a perspective view showing a portion of FIG. 1.

Referring to FIG. 4, a plurality of multi-well plates (MWP) may be disposed on the support plate 180. The multi-well plate (MWP) is composed of a plurality of wells. For example, the multi-well plate MWP may be composed of ninety six wells (eight wells arranged in the column direction and twelve wells arranged in the row direction). Such a multi-well plate (MWP) is made as a kit according to the function of analysis or extraction, and various samples can be added to the kit multi-well plate (MWP) according to the biological sample treatment to be treated.

For example, the wells of the first set column can be sealed after injecting proteolytic enzymes, RNA degrading enzymes, or buffers necessary for sample pretreatment for proteolysis or RNA degradation thereinto. The wells of the second set column can be sealed after injecting a cell dissolution solution dissolving the biological sample thereinto, the wells of the third set column can be sealed after injecting a binding solution thereinto, the wells of the fourth set column can be sealed after injecting a solution in which the magnetic particles dispersed thereinto, the wells of the fifth to seventh set column can be sealed after injecting a washing solution thereinto, and the wells of the eighth column can be sealed after injecting an eluting solution thereinto. That is, a solution for purifying a sample is accommodated in other unit wells except for one of the unit wells, and the same solution can be accommodated in the same unit well.

On the other hand, when the solution contained in the sealed unit well is an aqueous dispersion in which magnetic particles are dispersed, the magnetic particles dispersed in the aqueous dispersion may be spherical magnetic particles coated with silica.

Referring to FIGS. 1 to 4 again, after sliding the support plate 180 out of the biological sample processing apparatus 100 according to the present invention, a specific multi-well plate MWP is placed on the support plate 180, and the support plate 180 with the multi-well plate MWP slides into the biological sample processing apparatus 100. Then, when the biological sample processing apparatus 100 is driven, the pipette block 130 is moved along the row direction of the multi-well plate (I.e., the process direction D), and the biological sample processing operation is performed by sucking or discharging the sample into each well.

Figure 7:
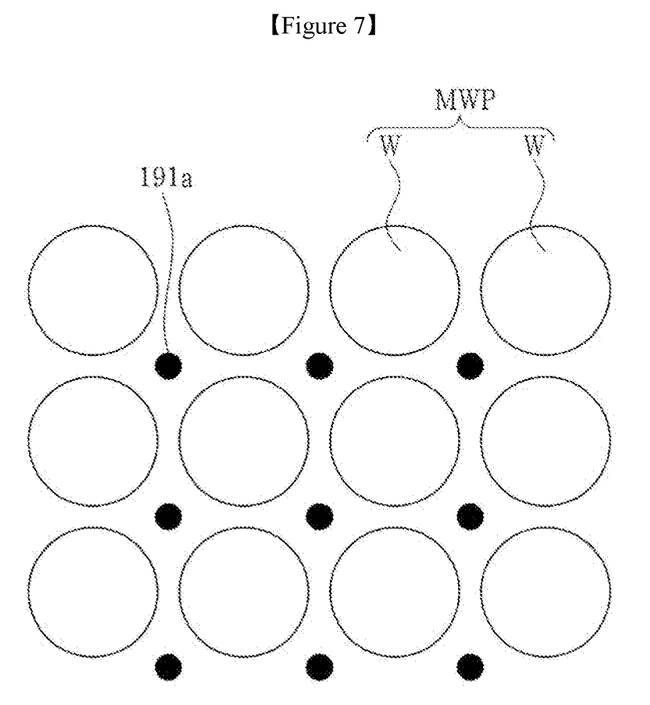
FIG. 7 is a schematic plan view showing the arrangement of the bar-shaped magnets in the magnetic field applying portion shown in FIG. 6.

FIG. 6 is a conceptual diagram of a heating unit and a magnetic field applying unit of the biological sample processing apparatus according to an exemplary embodiment of the present invention, and FIG. 7 is a schematic plan view showing the arrangement of the bar-shaped magnets in the magnetic field applying portion shown in FIG. 6. For convenience of explanation, the magnetic field applying unit and the heating unit are represented as schematic diagrams.

Referring to FIGS. 6 and 7, the magnetic field applying unit 191 is disposed below the multi-well plate MWP and applies a magnetic field to some wells W of the multi-well plate MWP. Thus, a magnetic field applied to the well W induces and separates the target material combined with the magnetic particles.

The heating unit 192 is disposed below the multi-well plate MWP so as to be spaced apart from the magnetic field applying unit, and heats some of the wells W of the multi-well plate MWP to evaporate the ethanol in the well where the work is completed.

Since the heating process is generally performed at the end of the processing operation, the magnetic field applying unit 191 is preferably disposed in front of the heating unit 192 based on the process direction.

As described above, when the magnetic field applying unit 191 and the heating unit 192 are separated from each other, it is possible to perform additional processes between the process of separation by applying a magnetic field, and the process of removing ethanol by heating, thereby making it possible to cope with a process required for new biological sample processing. Further, when the magnetic field applying unit 191 and the heating unit 192 are separately arranged as described above, it is possible to perform the secondary processing operation immediately without waiting for the cooling time of the heating unit after the primary processing operation, so that the analysis time can be shortened in performing multi-analysis. That is, in case that the magnetic field applying unit 191 and the heating unit 192 are disposed at the same position, the magnetic field is applied to separate the magnetic particles, and then the heating unit 192 is driven, so that there is no problem in a first processing operation. However, when a second processing operation is performed immediately, the heating unit 192 is heated in the magnetic particle separation step, and ethanol is evaporated, which is problematic. In order to prevent the problem, the heating unit 192 should stand by until the heating unit 192 is cooled. However, in case that the application unit 191 and the heating unit 192 are separately disposed, the secondary processing operation can be performed immediately without waiting until the heating unit 192 is cooled.

The biological sample processing apparatus 100 may further include a horizontal transfer unit 193 for transferring at least one of the magnetic field applying unit 191 and the heating unit 192. As described above, when the biological sample processing apparatus 100 includes the horizontal transfer unit 193 for transferring at least one of the magnetic field applying unit 191 and the heating unit 192, the biological sample processing apparatus 100 can perform biological sample processing even when receiving any multi-well plate (MWP).

That is, depending on the multi-well plate (MWP) (for example, multi-well plate manufactured by other manufactures), the position of the ending operation well in which ethanol evaporated, and the position of the well W in which the target material with which the magnetic particles are combined is separated may be different. In this case, it is possible to cope with the other multi-well plate by changing the positions of the magnetic field applying unit 191 and the heating unit 192.

Meanwhile, the horizontal transfer unit 193 can transfer the magnetic field applying unit 191 and the heating unit 192 individually. When the horizontal transfer unit 193 is configured to transfer the magnetic field applying unit 191 and the heating unit 192 individually, the degree of freedom is further increased so that even if any multi-well plate is accommodated, sample processing can be performed.

On the other hand, the magnetic field applying unit 191 may include a plurality of bar-shaped magnet bars 191a arranged in two diagonals of the matrix, as shown in FIG. 7. The magnetic field applying unit 191 may further include a magnet moving unit 191b for moving the magnet bars 191a up and down. The magnet moving unit 191b raises the magnet bars 191a in the four sides of the unit wells of the multi-well plate MWP, and lowers the magnet bars 191a to induce magnetic substances in the upper portion of the unit well downward.

As described above, when the magnetic field applying unit 191 includes a plurality of bar-shaped magnet bars 191a arranged in two diagonal directions of the matrix and a magnet moving unit 191b moving the magnet bars 191a up and down, it is easy to apply and release the magnetic field to the multi-well plate (MWP), and the target material combined with the magnetic particles at the upper portion of the well can be more easily guided to the lower portion.

Hereinafter, application example in which the embodiments of the present invention are used will be described in detail.

Figure 9:
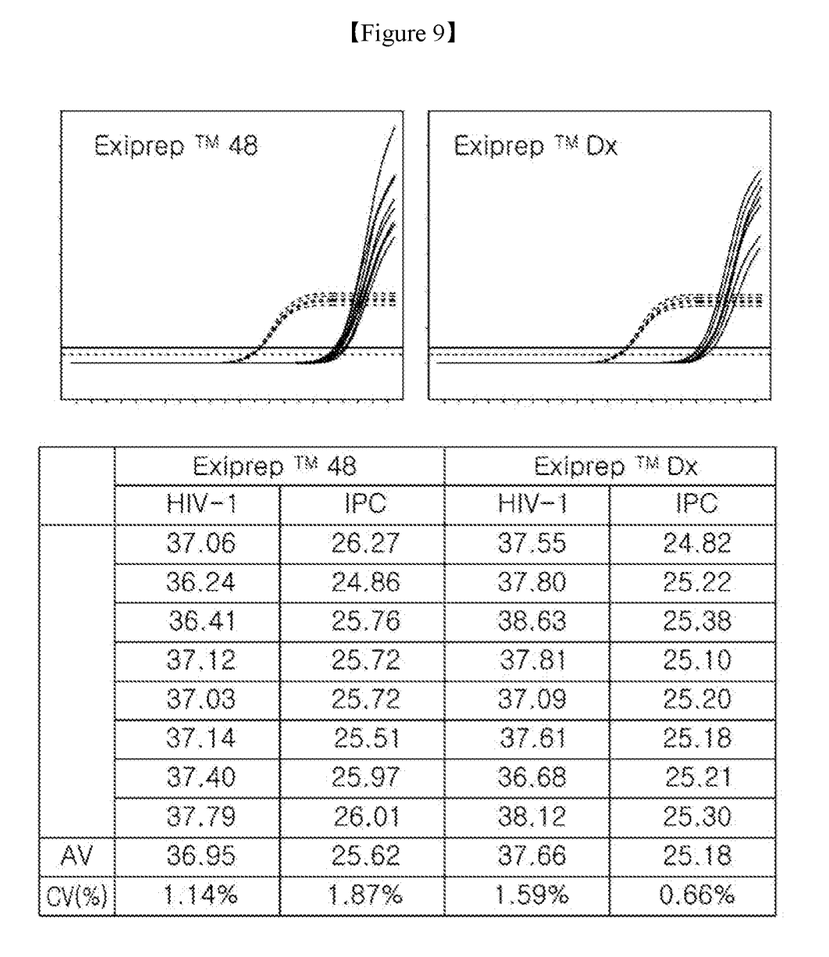
FIG. 9 shows the result of separating nucleic acid from a biological sample by using the biological sample processing apparatus of the present invention.

FIG. 9 is a graph showing the results of real-time RT-PCR for detecting HIV-1 in human plasma to compare the performance of the Exiprep™ Dx, which is a nucleic acid extracting device developed by the applicant in the past, with the biological sample processing apparatus (Exiprep™ 48) of the present invention. The difference in Ct value by one means that the corresponding nucleic acid is twice as much, which means that the smaller the Ct value, the more nucleic acids are contained.

Materials and methods used in the embodiments of the present invention will be described as follows.

First, in order to compare and confirm the performance of Exiprep™ Dx with the biological sample processing apparatus of the present invention, materials used for separating nucleic acids from biological samples will be described.

Biological Sample Preparation (1) The following Table 1 is a standard required for the performance comparison test of the present invention with Exiprep™ Dx (Bioneer), which is a conventional product.

TABLE 1

| Standard used for inspection | | |
|---|---|---|
| Standard appellation | Manufacturer | Remarks |
| EDTA Human plasma (Cat. No. HB-100) | Seracare | Matrix |
| WHO International Standard 3rd HIV-1 International Standard, NIBSC code: | NIBSC | Genotype B |

TABLE 1-continued

| Standard used for inspection | | |
|---|---|---|
| Standard appellation | Manufacturer | Remarks |
| 10/152 AccuPower ®HIV-1 Quantitative RT-PCR Kit | Bioneer | PCR kit |

TABLE 2

| Prepare biological samples for testing | |
|---|---|
| Inspection Required Quantity | Exiprep TM Dx 8ea (8 ea × 0.4 ml = 3.2 ml) Equipment of the present invention 8ea (8 ea × 0.8 ml = 6.4 ml) Total requirement 3.2 ml + 6.4 ml = 9.6 ml |
| first concentration | 185000 IU/ml |
| Dilution step 1 | EDTA Human Plasma 0.142 ml WHO HIV-1 panel 0.008 ml mix (First dilution concentration: 10000 IU/ml) |
| Dilution step 2 | EDTA Human Plasma 11.88 ml 0.12 ml of the first dilution (Final dilution concentration: 100 IU/ml) |

Isolation and Purification of Nucleic Acids

The biological samples prepared in reference to Table 2 were placed in each sample loading tube (Bioneer, KA-3011) in which internal positive control (IPC) is dried, and then the nucleic acid separation proceeds by the apparatus of the present invention and Exiprep™ Dx.

The volume of the sample for driving the Exiprep™ Dx equipment is 0.4 ml, and the volume of the sample for driving the apparatus of the present invention is 0.8 ml. The prep kit for nucleic acid extraction is a Viral DNA/RNA Kit (Bioneer, K-4471, Korea), and process are performed to extract nucleic acids from plasma.

The final volume of elution volume is equal to 80 μl, and 50 μl of the AccuPower® HIV Quantitative RT-PCR Kit (Bioneer, HIV-1111, Korea) used for real-time nucleic acid amplification.

Inspection Using Real-Time RT-PCR

Real-time RT-PCR is performed to identify nucleic acid isolation and purification using HIV-1 nucleic acids isolated from biological samples by using Exiprep™ Dx and the biological sample processing apparatus. After the top surface of the diagnostic kit was sealed using the adhesive sealing film of the AccuPower® HIV Quantitative RT-PCR Kit, and the diagnostic kit composition was thoroughly mixed using ExiSpin™ (Bioneer, Korea) and voltex. the sample is spined down using ExiSpin™. Real-time RT-PCR reaction conditions were the same as in Table 3, and Exi-Cycler™ 96 (Bioneer, Korea) was used for real-time nucleic acid amplification reaction.

TABLE 3

| Real-Time PCR Cycle | | | |
|---|---|---|---|
| Line | STEP | Temperature | Running Time |
| 1 | cDNA synthesis | 50 □ | 15 min |
| 2 | Pre Denaturation | 95 □ | 5 min |
| 3 | Denaturation | 95 □ | 5 sec |
| 4 | Annealing & Extension | 55 □ | 5 sec |
| 5 | Scan | | |
| 6 | Go to line 3 Cycle 45 | | |
| 7 | End | | |

Figure 10:
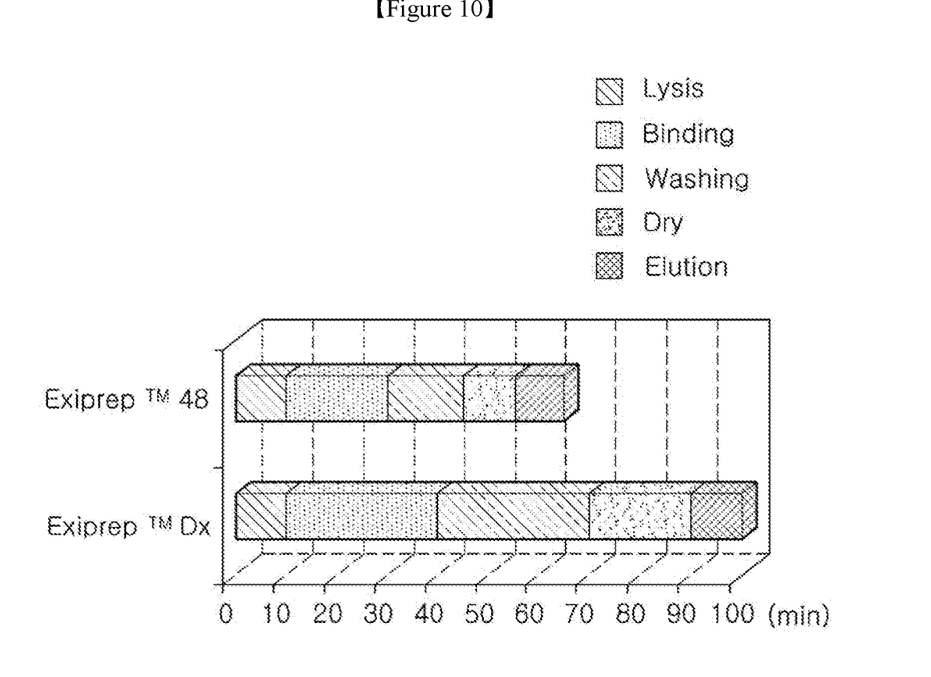
FIG. 10 shows the results of comparing the driving time of the biological sample processing apparatus of the present invention with a conventional biological sample processing apparatus.

FIG. 10 is a schematic diagram showing the time required for nucleic acid separation and purification when Exiprep™ Dx, which is a nucleic acid extraction device developed by the company, and a biological sample processing apparatus of the present invention are used.

As can be seen from FIG. 10, the time for binding, washing, and drying is greatly reduced, so that the overall processing time is greatly reduced.

Although the present invention has been described in the detailed description of the invention with reference to exemplary embodiments of the present invention, it will be understood to those skilled in the art that various modifications and variation can be made in the present invention without departing from the spirit or scope of the invention.

The invention claimed is:

1. A biological sample processing apparatus, comprising:
   a support plate on which a multi-well plate is disposed, wherein wells are arranged in the multi-well plate in a matrix shape along row and column directions of a matrix;
   a pipette block with which a plurality of pipettes for sucking or discharging a biological sample in the multi-well plate disposed on the support plate are detachably coupled;
   a pipette block forward and backward transfer unit which moves the pipette block along a forward and backward direction along a process direction;
   a pipette block top and bottom transfer unit which moves the pipette block along a vertical direction;
   a magnetic field applying unit disposed below the multi-well plate disposed on the support plate and applying a magnetic field to at least one well of the multi-well plate;
   a heating unit disposed below the multi-well plate disposed on the support plate, being spaced apart from the magnetic field applying unit, and heating at least one well of the multi-well plate; and
   a horizontal transfer unit positioned under the support plate and which transfers the magnetic field applying unit and the heating unit separately in a horizontal direction with respect to the multi-well plate such that the magnetic field applying unit and the heating unit individually move from a well to another well, respectively.

2. The biological sample processing apparatus of claim 1, wherein the magnetic field applying unit is disposed in front of the heating unit based on the process direction.

3. The biological sample processing apparatus of claim 1, wherein the magnetic field applying unit comprises a plurality of bar-shaped magnet bars arranged in two diagonal directions of the matrix.

4. The biological sample processing apparatus of claim 3, wherein the magnetic field applying unit comprises a magnet moving unit configured to move the magnet bars up and down.

5. The biological sample processing apparatus of claim 1, further comprising:
   a punching unit including at least one punch which punches and opens a cover of the multi-well plate.

6. The biological sample processing apparatus of claim 5, wherein the punching unit is configured to be detachably combined with the pipette block to be transferred by the pipette block forward and backward transfer unit and the pipette block top and bottom transfer unit.

7. The biological sample processing apparatus of claim 1, further comprising:
   a pipette storage receptacle configured to store a separated pipette that is used in a first step in a process; and
   a pipette buffer receptacle configured to store a pipette to be used in a second step in the process.

8. The biological sample processing apparatus of claim 7, further comprising:
   a sensor configured to sense whether the pipette storage receptacle is mounted on the support plate.

9. The biological sample processing apparatus of claim 8, further comprising:
   an alarm unit configured to notify that the pipette storage receptacle is not installed as a result of detection by the sensor.

10. A biological sample processing apparatus, comprising:
    a support plate on which a multi-well plate is disposed, wherein wells are arranged in the multi-well plate in a matrix shape along row and column directions of a matrix;
    a pipette block with which a plurality of pipettes for sucking or discharging a biological sample in the multi-well plate disposed on the support plate are detachably coupled;
    a pipette block forward and backward transfer unit which moves the pipette block along a forward and backward direction along a process direction;
    a pipette block top and bottom transfer unit which moves the pipette block along a vertical direction;
    a punching unit including at least one punch arranged in a single row, and which punches and opens a cover of the multi-well plate; and
    a horizontal transfer unit positioned under the support plate and which transfers a magnetic field applying unit and a heating unit separately in a horizontal direction with respect to the multi-well plate such that the magnetic field applying unit and the heating unit individually move from a well to another well, respectively,
    wherein the punching unit is detachably combined with the pipette block and is transferrable by the pipette block forward and backward transfer unit in the process direction and by the pipette block top and bottom transfer unit in the vertical direction, and
    wherein the punching unit punches selected wells only out of all wells of the multi-well plate.

11. The biological sample processing apparatus of claim 10, further comprising:
    a pipette storage receptacle configured to store a separated pipette that is used in a first step in a process; and
    a pipette buffer receptacle configured to store a pipette to be used in a second step in the process.

12. The biological sample processing apparatus of claim 11, further comprising:
    a sensor configured to sense whether the pipette storage receptacle is mounted on the support plate.

13. The biological sample processing apparatus of claim 12, further comprising:
    an alarm unit configured to notify that the pipette storage receptacle is not installed as a result of detection by the sensor.

* * * * *